INVENTORS
ELISABETH ADAM
LOUIS W. GRANIRER
ATTORNEYS.

2,907,695

PREPARATION DERIVED FROM PLACENTAL TISSUE FOR RELIEVING RHEUMATOID ARTHRITIS

Elisabeth Adam, New York, and Louis W. Granirer, Forest Hills, N.Y.

Application March 3, 1955, Serial No. 491,874

3 Claims. (Cl. 167—74)

Our invention relates to a new and improved medicinal agent or composition, which is useful for relieving the pains and symptoms of rheumatoid arthritis and to the administration thereof for relieving said symptoms. This agent or composition may be prepared from fresh human placentas. Our invention also relates to a new and improved method of preparing the new agent or composition. The invention includes the new agent or composition, irrespective of the starting material and irrespective of the method of manufacture. This new agent consists of or includes an enzyme or anti-enzyme or agent which inactivates the rheumatoid or arthritic process.

According to one embodiment of our invention, but without limitation thereto, the fresh human placentas are immediately finely ground, and the entire finely ground placentas are immediately mixed with a suitable solvent, which extracts said enzyme or anti-enzyme or active principle. This solvent is exemplified, without limitation thereto, by an acidified solvent which consists substantially of ethyl alcohol or methyl alcohol, or which consists substantially of 75 parts of ethyl alcohol and 25 parts of water, this ratio being by volume. The ethyl alcohol may be replaced by methyl alcohol, as an equivalent for ethyl alcohol. Whenever ethyl alcohol is mentioned, this includes methyl alcohol.

This acidified solvent also precipitates serum globulin and other undesirable proteins, which are separated.

If a non-acidified solvent is used, the desired active material is not dissolved in the non-acidified solvent. In such case, the active material may be separated from the undissolved residue by further fractionation. However, for economy of production, it is highly desirable to use an acidified solvent, as above exemplified, which extracts or dissolves the active material.

For this purpose, said solvent mixture of ethyl alcohol (or methyl alcohol) and water, is first acidified to an original pH of 2.7, by adding a suitable acid agent, such as sulfuric acid or hydrochloric acid, before mixing said solvent mixture with the ground placenta. Concentrated sulfuric acid is the preferred acid agent.

The human placentas contain some alkaline ingredient or ingredients. When this solvent, which has an original pH of 2.7, is mixed with the finely ground and fresh human placentas, during a mixing period of two hours as later described, the pH of the final mixture may be 5.4.

This selected pH of 5.4 corresponds to the isoelectric point of serum globulin and other blood proteins, at which the undesirable proteins can be precipitated without heating. As is well-known, the isoelectric points of some carefully purified proteins correspond to respective pH values as follows:

| Protein: | pH value |
|---|---|
| Serum albumen | 4.7 |
| Casein | 4.7 |
| Gelatin | 4.7 |
| Egg albumen | 4.8 |
| Serum globulin | 5.4 |
| Edestin | 6.9 |

The fresh and finely ground human placentas are immediately vigorously mixed with said previously acidified solvent for two hours, at 20° C.–30° C., under normal atmospheric pressure of 760 millimeters of mercury, to produce an intimate and uniform mixture, in which the undesirable proteins are wholly or largely precipitated, and in which the desired ingredient or ingredients of the human placentas are dissolved or extracted in the liquid fraction of said mixture. At the end of said mixing period of two hours, the mixture has a red-brown color, like beef broth.

As one example, the mixture may be allowed to stand, without agitation, during a period of four to five hours, in an ordinary refrigerator, in which the temperature may be about 0° C., without freezing the mixture. This completes the extraction and also completes the precipitation of the undesirable proteins, if the precipitated proteins are separated by high-speed centrifuging.

If it is desired to separate the precipitated proteins from the solution or extract by ordinary filtration, instead of using a centrifuge, a longer period of standing, without agitation, is used, as 48 hours to 96 hours. During this period, the mixture may be kept in an ordinary refrigerator at about 0° C., without freezing.

This total long period of standing, 48 hours to 96 hours, may be in two equal standing periods or steps.

At the end of the period of the first standing step, namely, 24 hours to 48 hours, the solid fraction of the mixture is separated from the liquid fraction by any method, such as ordinary filtration, thus producing a first filtrate or first separated liquid fraction.

The pH of the first filtrate or first separated liquid fraction is tested. It is usually 5.4. If said pH is above 5.4, said pH is adjusted to a pH of 5.4, by adding a suitable acidifying agent such as sulfuric acid or hydrochloric acid, and the first separated liquid fraction or filtrate is kept without agitation in an ordinary refrigerator, as at about 0° C., without freezing, during the second standing step or period, which may also be 24 hours to 48 hours.

At the end of said second standing step, the liquid fraction is separated from all precipitated materials, as by ordinary filtration or any other method.

The resultant final liquid fraction or second filtrate has a clear, straw-yellow color.

By maintaining said pH of 5.4 or substantially 5.4, during a total period which may be 48 hours to 96 hours, undesirable proteins are precipitated to be easily separated from the final liquid fraction, as by ordinary filtration.

We do not know the exact formula of the dissolved or extracted material in the final straw-yellow fraction.

We believe that the dissolved or extracted material in said clear, straw-yellow final liquid fraction includes a salt or a compound of magnesium and the phosphate group. It also includes the active enzyme or principle.

Ammonium sulfate, $(NH_4)_2SO_4$, is now optionally dissolved in said clear, straw-yellow final liquid fraction. The function of the ammonium sulfate is to assist in the formation of the new composition when ammonium hydroxide is subsequently added. The use of the ammonium sulfate may be omitted and ammonium hydroxide may be added directly to said clear, straw-yellow final liquid fraction. The added and dissolved ammonium sulfate does not form any precipitate, if it is used.

The pH of the final liquid fraction is adjusted to above 7, as to a value of 9.6, as by adding concentrated ammonium hydroxide to said final liquid fraction. The ammonium hydroxide contains the ammonium radical, which is generally classified as an alkali metal. Other alkali metals can be used, as in their hydroxides.

This produces a crystalline precipitate of the desired composition or medicinal agent, subject to later purification by washing said precipitate with distilled water, until the pH of the wash water is 7 or slightly above 7.

This precipitate contains the active enzyme or principle and it is one form of the desired agent or composition, which can also be produced in amorphous form, as later described.

This precipitate is easily separated from the liquid part of the final liquid fraction, as by ordinary filtration or centrifuging, and the separated precipitate is purified by washing it with distilled water until the wash water is only slightly alkaline.

This purified precipitate is air-dried at moderate temperature, such as 30° C.

The purified and dry precipitate can be suspended in a suitable vehicle, such as propylene glycol, $CH_3CHOHCH_2OH$, together with the usual preservative, to be injected either by intramuscular injection or subcutaneous injection.

In general, the dry weight of said precipitate is about 0.06 percent of the weight of the original batch of human placentas. That is, about seven hundred milligrams are secured, per kilogram of the human placentas.

Instead of using propylene glycol as the vehicle, we can use a sterile isotonic or normal solution of sodium chloride, or sterile distilled water.

Our invention is further described in the annexed description and drawings.

Figs. 1 and 2 are to a scale of 180 diameters.

Figure 1:
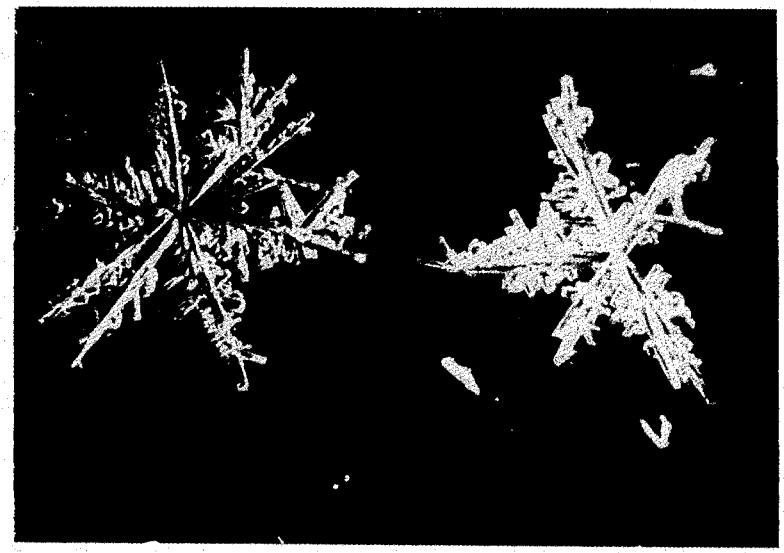
Figure 1 is a microphotograph of the pure crystals of the precipitated composition.

The pure crystals which are made as above described, are shown in Fig. 1. They have a size of five millimicrons to sixty millimicrons. They have a rhomboid, radiating, star-like shape.

Figure 2:
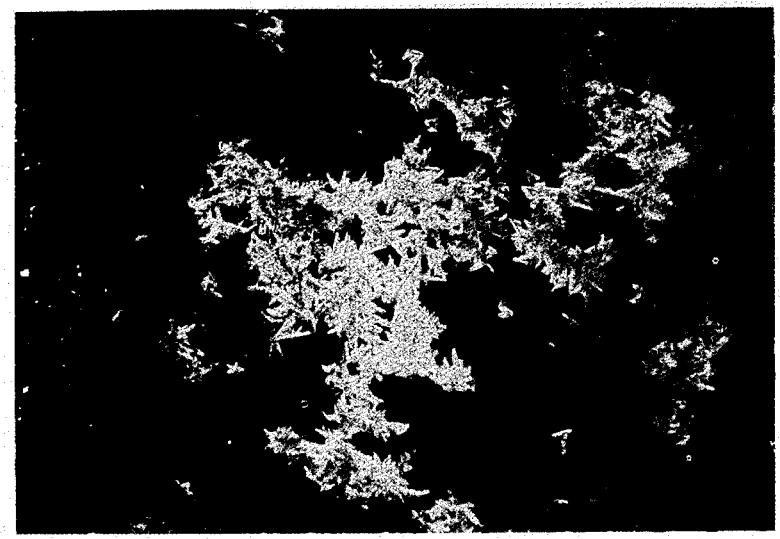
Fig. 2 is a microphotograph of the crystals of ordinary tri-basic magnesium phosphate, $Mg_3(PO_4)_2 \cdot 5H_2O$.

The crystals of the ordinary tri-basic magnesium phosphate which are shown in Fig. 2, have a fern-like shape and are of much more uniform size, with an average size of twenty millimicrons.

The invention is not limited to the specific figures or values which have been previously stated.

One practical example of the invention is stated below, without limitation thereto.

The solvent is a mixture (by volume) of 75 percent of ethyl or methyl alcohol and 25% of water.

This solvent is acidified to a pH of 2.7, by adding concentrated sulfuric acid or hydrochloric acid which does not substantially increase the volume of said mixture of ethyl alcohol and water.

One kilogram of the fresh and finely ground human placentas is mixed with one liter of said acidified solution. This is done vigorously for two hours at 20° C.–30° C. This mixing is done at normal atmospheric pressure of 760 millimeters of mercury. All the operations disclosed in this example are conducted at said normal pressure. This mixing step produces a uniform mixture which has a red-brown color, like beef broth. The resultant mixture has a liquid fraction, in which the desired material or enzyme or active principle of the placentas is extracted or dissolved. The resultant mixture also has a solid fraction.

At the end of said mixing period of two hours, the pH of the mixture may be 5.4.

All pH measurements mentioned herein are made at 25° C., using the pH electric meter and the glass electrode.

In this example, said mixture is allowed to stand, without agitation, during two periods, each of which is 24 hours to 48 hours. The mixture is allowed to stand in an ordinary refrigerator at about 0° C., without freezing the mixture. The refrigerator is used in order to prevent deterioration of organic matter.

At the end of the first standing period of 24 hours to 48 hours in the refrigerator, the pH of the liquid fraction is tested. It is usually 5.4 to 6.4. If the pH value is above 5.4 at the end of this first period of 24–48 hours, the pH is immediately lowered to 5.4, as by adding concentrated sulfuric acid or concentrated hydrochloric acid.

The liquid fraction is then immediately separated from the precipitated material as by ordinary filtration, to produce a first filtrate or first separated liquid fraction.

This first filtrate or first separated liquid fraction is again kept without agitation in a refrigerator without freezing, at ordinary refrigerator temperature, which may be about 0° C., during a second standing period of 24 to 48 hours.

At the end of this second standing period of 24 hours to 48 hours, the liquid fraction of this second filtrate or final liquid fraction is immediately separated from any solid part thereof, as by ordinary filtration or centrifuging.

This results in a second filtrate or final liquid fraction, which has a clear straw-yellow color. Its pH is usually 4.2 to 5.4.

Ammonium sulfate, $(NH_4)_2SO_4$, is optionally dissolved in said filtrate. This ammonium sulfate conforms to the standards of page 1324 of the 1947 edition of "The Dispensatory of the United States of America."

If ammonium sulfate is used, 2.5 grams of the ammonium sulfate are dissolved per liter of said second filtrate or final straw-yellow liquid fraction. As above noted, the use of the ammonium sulfate may be omitted.

If ammonium sulfate is added, it does not produce any precipitate.

If ammonium sulfate is added, it does not substantially change the pH value.

The pH of the second filtrate or final liquid fraction is adjusted, either with or without said addition of ammonium sulfate, to a value of 9.6, by adding a suitable alkaline precipitating agent. This may be an aqueous solution of ammonia, which has 9 grams to 10 grams of dissolved ammonia per 100 cc. of water.

This produces a crystalline white precipitate. This precipitate is one form of the final agent or composition.

The precipitate is separated by filtration, at 20°–30° C., and the separated precipitate is thoroughly washed at 20° C.–30° C. with distilled water, until the wash water has a pH close to seven or a pH of seven.

The washed precipitate is then dried at 20° C.–30° C., in air. The shape of the dry crystals is shown in Fig. 1.

The pure and dry precipitate is soluble in dilute mineral acids, as in a 10% aqueous solution by volume of sulfuric acid.

The dry precipitate is dissolved in said diluted or 10% aqueous solution (by volume) of sulfuric acid at 20° C.–30° C., and the precipitate is reformed and recrystallized by adding a suitable alkaline agent, such as said aqueous solution of ammonia at 20° C.–30° C., to said solution in said acid solvent. If ammonium hydroxide is used, an ammonium complex is formed. The invention is not limited to the use of the ammonium radical. The recrystallized precipitate is separated and again purified by washing with distilled water, until the wash water is again only slightly alkaline or even neutral.

The crystals are again dried in air under said normal pressure, at 20° C.–30° C.

These crystals are the pure new composition, in one solid form thereof. As above noted, Fig. 1 shows the shape of these crystals.

The invention is not limited to the agent or composition in solid form, or to a solid agent or composition in the crystalline shape shown in Fig. 1.

Thus, said crystals of the agent may be dissolved in the original acidified organic solvent which was used to extract the fresh human placentas and which has a pH of 2.7, and the solute can be precipitated by an alkaline agent such as ammonium hydroxide. In such case, the precipitate is in amorphous form, instead of being in crystalline form. This amorphous form is included in the invention. It also contains the enzyme or active principle.

Ordinarily, about 600 to 700 milligrams of the pure and dry solid crystalline composition are extracted by this method from a kilogram of the human placenta material.

The solid composition is mixed for intramuscular or subcutaneous injection with a suitable vehicle. This vehicle may be a mixture (by volume) of 70% of propylene glycol ($CH_3.CHOH.CH_2OH$) and 30% of distilled water. The propylene glycol conforms to the standards of page 940 of said "The Dispensatory of the United States of America."

As above noted, other vehicles may be used, such as a sterile isotonic aqueous solution of sodium chloride, or sterile distilled water.

A small percentage of phenol ($C_6H_5OH$) such as 0.1%, may be added as a preservative. Each cubic centimeter of this injection composition preferably has fifty milligrams of the crystalline precipitate, in finely divided form.

The new material or the base thereof is not ordinary tribasic magnesium phosphate. This is evidenced by the different shape of its crystals. It is also evidenced by an entirely different ignition loss.

Ordinary tribasic magnesium phosphate has an ignition loss which is not less than 20% and not more than 27%, according to the "National Formulary."

The crystals of the new composition have an ignition loss of 46.5% to 46.6% by weight, or about 50% by weight.

TESTS OF THE NEW COMPOSITION

According to standard tests, the base of the new composition is a complex which includes magnesium and also includes the phosphate group, $PO_4$. Ammonium hydroxide or other alkaline agent may be used as the precipitating agent. This base includes the effective enzyme or active principle of the human placentas. The invention includes the isolated or extracted anti-rheumatoid enzyme or active principle of the human placentas, irrespective of any base or vehicle or supplemental material.

As above noted, when the crystals of the composition are ignited, there is an ignition loss of 46.5% to 46.6% by weight, thus leaving a residue or ash, whose weight is about 53% of the weight of the crystals. This is approximately 50%.

This residue or ash is responsive to standard tests for magnesium and for the phosphate group.

The proportion of the magnesium is greater than the proportion of phosphorus, if these are calculated as elements, in said ash.

TEST FOR THE PHOSPHATE GROUP

As stated in the 1947 edition of "The Dispensatory of the United States of America" and in the eighth edition (published in 1946) of "The National Formulary" published by the American Pharmaceutical Association, there are certain standards and tests for ordinary tribasic magnesium phosphate, $Mg_3(PO_4)_2.5H_2O$, and these tests have been used, in order to provide certain tests for identifying the new agent or composition, in addition to other tests.

Ammonium molybdate test solution, as described in page 1683 of the 1947 edition of "The Dispensatory of the United States of America," is prepared by dissolving 6.5 grams of finely powdered molybdic acid in a mixture of 14 cc. water and 14.5 cc. of stronger ammonia test solution. This stronger ammonia solution contains not less than 27% or more than 29% by weight of $NH_3$. This solution is added slowly, without stirring, to a well-cooled mixture of 32 cc. of nitric acid and 40 cc. of water. It is allowed to stand for 48 hours, and then filtered through asbestos.

Said page 1683 also describes ammonia test solution, which is an aqueous solution of ammonia which has not less than 9.5% and not more than 10.5% of $NH_3$ by weight.

If said ammonium molybdate test solution is added to a solution of ordinary tribasic magnesium phosphate in dilute nitric acid, the result is to produce a greenish-yellow precipitate of ammonium phosphomolybdate, which is soluble in said ammonia test solution.

When the crystals of the new composition are dissolved in dilute nitric acid, and said test solution of ammonium molybdate is added to the solution, a greenish-yellow precipitate is produced, which is soluble in said ammonia test solution.

This test is a standard test for the phosphate group, $PO_4$.

This test evidences that the base or vehicle of the new agent or composition has said phosphate group.

TEST FOR MAGNESIUM

This test is described in "Lehrbuch der Analytische Chemie" by Treadwell.

The crystals of the new composition are dissolved in dilute nitric acid. Excess nitric acid is added. The solution is heated with metallic tin, to produce a precipitate of stannic phosphate $Sn_3(PO_4)_4$, which is separated by filtration, leaving a clear filtrate.

Ammonium chloride and ammonium hydroxide and ammonium phosphate are consecutively dissolved in said clear filtrate. This produces a crystalline precipitate of acid ortho-magnesium phosphate, $MgHPO_4.7H_2O$.

This test shows that the new composition contains magnesium.

ANOTHER TEST FOR PHOSPHATE 100 milligrams of the pure and dry crystals of the new composition are dissolved in dilute nitric acid. Dilute nitric acid, whenever mentioned herein, is an aqueous solution of nitric acid, which contains 10% of nitric acid.

This solution is warmed to 50° C.

80 cc. of said test solution of ammonium molybdate are warmed in a separate vessel to 50° C.

Said test solution of ammonium molybdate is added slowly to said solution of the crystals, with constant stirring, keeping the temperature at 50° C. The final mixture is kept at 50° C. for 30 minutes.

This results in a precipitate of ammonium phosphomolybdate, $(NH_4)_3.PO_4.12MoO_3$.

This precipitate is removed by filtration. The precipitate is washed with distilled water, until the wash water ceased to be acid to litmus paper.

The precipitate is then dissolved in 40 cc. of one normal aqueous solution of sodium hydroxide.

The solution is then titrated with a one normal aqueous solution of sulfuric acid, using phenolphthalein as the indicator.

In this assay, one cubic centimeter of this solution is equivalent to 7.674 milligrams of ordinary tri-basic magnesium phosphate, $Mg_3(PO_4)_2.5H_2O$.

According to this assay, 100 milligrams of the crystals of the new composition correspond to 88.5 milligrams of ordinary tri-basic magnesium phosphate.

The tests of the new material showed very little organic matter, about 4.4% of nitrogen; about 0.3% of carbon. These tests showed about 5.9% of hydrogen.

The Kjeldahl test was used for assaying the nitrogen.

100 milligrams of the pure and dry crystals of the composition are soluble in 20 cc. of said 10% nitric acid.

As another test, the pure and dry crystals of the composition were heated in air in an autoclave, under a pressure of 15 pounds per square inch in excess of normal atmospheric pressure, for 15 minutes. The new composition lost about 75% of its activity for the desired purpose. This test showed that said crystals contained an active agent which was sensitive to heat and pressure.

CLINICAL TESTS

Observations have been made on fifty patients with an active and advanced rheumatoid arthritis. This group included men and women whose ages varied from 24 to 65, and the duration of the disease ranged from one to twelve years. Each patient fulfilled the criteria for rheumatoid arthritis, as established by the American Rheumatism Association, and had been refractory to all previous therapy, including gold salts, cortisone and ACTH. Appropriate clinical, hematologic, roentgenologic and weight recordings were made at regular intervals.

In order to provide adequate controls, the injection solution was, in some cases, preceded and, in other cases, replaced by the use of an injection control solution of ordinary tri-basic magnesium phosphate in the same dosage.

The times when the control solution and the improved composition were injected, were always unknown to the patient, and even unknown to the physician for several weeks.

In general, the characteristic response to the improved injection dose of 50 milligrams of the crystals of the new composition was a striking clinical improvement. Often, muscular and articular stiffness, as well as pain, were markedly relieved within a few hours after the first dosage of 50 milligrams. Flexion deformities of the knees or elbows were improved, and rheumatoid nodules diminished in size. Within a few days the patients felt stronger and more cheerful and were able to perform previously impossible or difficult acts such as climbing stairs, rising from chairs or beds unassisted, or holding a glass. There were no toxic effects.

According to the criteria published in the "Journal of the American Medical Association," vol. 140, page 349 (1949), at least 70 percent of the group could be classified as a major improvement.

Most of these patients had been unable to do their usual work from a few months to more than two years before being given the improved preparation. The best effect was obtained by a daily dosage of 50 milligrams, injected subcutaneously.

As a result of more than twelve hundred intromuscular and subcutaneous injections, no undesirable side reactions resulted.

As one typical example, the laboratory findings in one patient were as follows:

*Laboratory findings*

CASE 1

| Hemogram | Before Treatment | After Treatment |
| --- | --- | --- |
| Hemoglobin (Haden-Hausser) | 74% (11 gm.) | 90% (15 gm.) |
| Red Blood Cells | 3,750,000 | 4,700,000 |
| White Blood Cells | 11,400 | 6,000 |
| Neutrophiles | 60 | 48 |
| Band Cells | 0 | 2 |
| Eosinophiles | 1 | 1 |
| Lymphocytes | 36 | 40 |
| Monocytes | 3 | 5 |
| Basophiles | 1 | 2 |
| Sedimentation Rate (Westergren) mm | 55 | 18 |
| Blood Levels: | | |
| Sodium mg | 311 | 303 |
| Potassium mg | 17.2 | 17.6 |
| Urea Nitrogen mg | 13.5 | 15.1 |
| Sugar mg | 90 | 85 |
| Total Protein grams | 7.0 | 7.0 |
| Albumin | 4.5 | 3.9 |
| Globulin | 2.7 | 3.1 |
| A/G Ratio | 1.6 | 1.3 |
| Uric Acid mg | 4.1 | 2.9 |
| Total Cholesterol mg | 185 | 210 |
| Free Cholesterol mg | 28 | 54 |
| Urinary 17-Ketosteroids mg | 4.1 | 8.6 |

There were no urinary changes.

There was an improvement in the sedimentation rate of the blood, in the red blood cell count and in the haemoglobin. The sodium and potassium level of the blood were not disturbed, which is very important. There was an increase in the 17 keto-steroid urinary excretion.

We believe that the new agent has an enzyme or anti-enzyme which is incorporated in a magnesium salt vehicle.

We believe that we are the first to show the high concentration of combined magnesium in the human placenta.

We believe that the improved composition contains an enzyme or anti-enzyme or active agent in the form of an enzyme-complex. This complex dissociates when injected, to release the active agent or enzyme, which inactivates the rheumatoid process.

This is evidenced by the fact that the improved composition relieves the swelling and tenderness of the joints, and helps to restore motion at the joints.

We have disclosed a precipitation method for separating the new agent or principle from the placental extract, but the invention is not limted thereto. Thus, the solvent can be separated from said protein-free placental extract by evaporation, in order to provide a residue of the new medicinal product.

As another optional example of our invention, the new complex or composition can be dissolved in an aqueous dilute solution of hydrochloric acid, to produce a solution whose pH is 3.2 to 4.0. This solution is filtered through a bacterial filter to make it sterile.

The crystals begin to dissolve in said dilute aqueous solution of hydrochloric acid, when said aqueous solution of hydrochloric acid has a pH of about 2.7.

Said solution in an aqueous solution of hydrochloric acid, at a pH of 3.2 to 4.0, can be injected by intramuscular or subcutaneous injection, with a very fine needle, of No. 27 gauge.

This pH of 3.2 to 4.0 is not objectionable, because "Globin" insulin is injected at said pH. This pH of 3.2 to 4.0 is raised to a value of 7.0 in the body, thus precipitating the crystals while releasing the active agent. Hence, the new agent may be injected while dispersed in a vehicle at a pH of 7, in an acid medium at a pH below 7.

We have described preferred embodiments of our invention, but numerous changes, additions, substitutions and omissions may be made without departing from its scope.

We claim:

1. A method of treating the human placenta, which consists in mixing the finely ground placenta with an acid extracting mixture which consists substantially of 75% of ethyl alcohol and 25% of water by volume at a pH of substantially 2.7, thus dissolving an agent of said human placenta in said extracting mixture while maintaining said extracting mixture acid and precipitating proteins which are extracted by said extracting mixture from said placenta by allowing the orignal extract to stand in the cold for at least twenty-four hours; separating such proteins to provide a liquid fractional extract which has a clear, straw-yellow color; and dissolving an alkaline hydroxide in said liquid fractional extract to produce a crystalline precipitate which is insoluble in water at a pH of substantially seven, separating said precipitate, thus producing a precipitate which has magnesium and the phosphate group in combined form.

2. A method according to claim 1, in which the alkaline hydroxide is ammonium hydroxide, and enough ammonium hydroxide is added to produce a pH of substantially 9.6 in the reaction mixture.

3. The product made by the method of claim 1.

(References on following page)

References Cited in the file of this patent

UNITED STATES PATENTS 1,817,686    Hartman _____ Aug. 4, 1931

OTHER REFERENCES

The Merck Index, 6th ed., 1952, p. 18.

Lyon: Proc. Soc. Exptl. Biol. and Med., vol. 35, January 1937, pp. 645–648.

Opsahl: Yale J. of Biol. and Med., vol. 24, No. 3, December 1951, pp. 199 and 200.

De Courcy: Nature, vol. 170, Sept. 20, 1952, p. 494.